(12) United States Patent
López Quesada et al.

(10) Patent No.: US 11,325,361 B2
(45) Date of Patent: May 10, 2022

(54) MULTILAYERED POLYOLEFIN FILMS

(71) Applicant: TAGHLEEF INDUSTRIES, S.L.U., Jaén (ES)

(72) Inventors: Manuel López Quesada, Jaén (ES); Cristina López Jaén, Jaén (ES)

(73) Assignee: TAGHLEEF INDUSTRIES, S.L.U., Jaén (ES)

( * ) Notice: Subject to any disclaimer, the term of this patent is extended or adjusted under 35 U.S.C. 154(b) by 294 days.

(21) Appl. No.: 16/499,037

(22) PCT Filed: Mar. 23, 2018

(86) PCT No.: PCT/EP2018/057422
§ 371 (c)(1),
(2) Date: Sep. 27, 2019

(87) PCT Pub. No.: WO2018/177917
PCT Pub. Date: Oct. 4, 2018

(65) Prior Publication Data
US 2021/0001613 A1 Jan. 7, 2021

(30) Foreign Application Priority Data
Mar. 28, 2017 (EP) ..................................... 17382154

(51) Int. Cl.
*B32B 27/16* (2006.01)
*B32B 27/32* (2006.01)
(Continued)

(52) U.S. Cl.
CPC ............ *B32B 27/327* (2013.01); *B32B 21/08* (2013.01); *B32B 27/08* (2013.01); *B32B 27/16* (2013.01);
(Continued)

(58) Field of Classification Search
CPC . B32B 21/08; B32B 2250/05; B32B 2250/24; B32B 2250/242; B32B 2255/10;
(Continued)

(56) References Cited

U.S. PATENT DOCUMENTS 4,188,443 A  2/1980 Mueller et al.
4,828,928 A  5/1989 Shah
(Continued)

FOREIGN PATENT DOCUMENTS

CA  2449161 A1  12/2002
CN  104029554 A  9/2014
(Continued)

OTHER PUBLICATIONS

International Search Report and Written Opinion for PCT/EP2018/057422, dated Apr. 19, 2018.

*Primary Examiner* — Lawrence D Ferguson
(74) *Attorney, Agent, or Firm* — Daniel R. Evans; Merchant & Gould P.C.

(57) ABSTRACT

The invention relates to a polyolefin film comprising at least five layers: a core layer (a), comprising a polyolefin; an outer supporting layer (b), comprising copolymers of ethylene and propylene; an inner supporting layer (c), on the face of the core layer opposite to the outer supporting layer, comprising a polyolefin; a first coating layer (d) immediately in contact with the inner supporting layer (c), and finally a second coating layer (e) immediately in contact with the inner supporting layer (c), both comprising copolymers of ethylene with one or several polar monomers. In addition, the present invention relates to the process of manufacturing said polyolefin film and also the uses thereof for coating a substrate.

21 Claims, 1 Drawing Sheet

(51) Int. Cl.
- *B32B 21/08* (2006.01)
- *B32B 27/08* (2006.01)
- *B32B 27/20* (2006.01)
- *B32B 27/30* (2006.01)
- *B32B 27/34* (2006.01)
- *B32B 27/36* (2006.01)
- *B32B 27/40* (2006.01)

(52) U.S. Cl.
CPC .......... *B32B 27/205* (2013.01); *B32B 27/306* (2013.01); *B32B 27/308* (2013.01); *B32B 27/34* (2013.01); *B32B 27/36* (2013.01); *B32B 27/40* (2013.01); *B32B 2250/05* (2013.01); *B32B 2250/24* (2013.01); *B32B 2255/10* (2013.01); *B32B 2255/26* (2013.01); *B32B 2255/28* (2013.01); *B32B 2264/104* (2013.01); *B32B 2264/1022* (2020.08); *B32B 2270/00* (2013.01); *B32B 2307/402* (2013.01); *B32B 2307/518* (2013.01); *B32B 2307/71* (2013.01); *B32B 2307/732* (2013.01); *B32B 2307/75* (2013.01); *B32B 2310/0445* (2013.01); *B32B 2310/14* (2013.01); *B32B 2323/046* (2013.01); *B32B 2323/10* (2013.01); *B32B 2329/04* (2013.01); *B32B 2331/04* (2013.01); *B32B 2333/08* (2013.01); *B32B 2367/00* (2013.01); *B32B 2375/00* (2013.01); *B32B 2377/00* (2013.01); *B32B 2439/70* (2013.01); *B32B 2479/00* (2013.01)

(58) Field of Classification Search
CPC ............ B32B 2255/26; B32B 2255/28; B32B 2264/102; B32B 2264/1022; B32B 2264/104; B32B 2270/00; B32B 2307/402; B32B 2307/4023; B32B 2307/41; B32B 2307/518; B32B 2307/584; B32B 2307/71; B32B 2307/732; B32B 2307/75; B32B 2310/0445; B32B 2310/14; B32B 2323/046; B32B 2323/10; B32B 2329/04; B32B 2331/04; B32B 2333/08; B32B 2367/00; B32B 2375/00; B32B 2377/00; B32B 2439/70; B32B 2479/00; B32B 27/08; B32B 27/10; B32B 27/16; B32B 27/20; B32B 27/205; B32B 27/306; B32B 27/308; B32B 27/32; B32B 27/327; B32B 27/34; B32B 27/36; B32B 27/40
See application file for complete search history.

(56) References Cited

U.S. PATENT DOCUMENTS

| | | |
|---|---|---|
| 2004/0146730 A1 | 7/2004 | Holzer et al. |
| 2014/0205847 A1 | 7/2014 | Falla |
| 2016/0082700 A1 | 3/2016 | Kiljunen et al. |
| 2016/0340916 A1 | 11/2016 | Wright et al. |

FOREIGN PATENT DOCUMENTS

| | | |
|---|---|---|
| EP | 0782917 A1 | 7/1997 |
| WO | 2013/017375 A1 | 2/2013 |

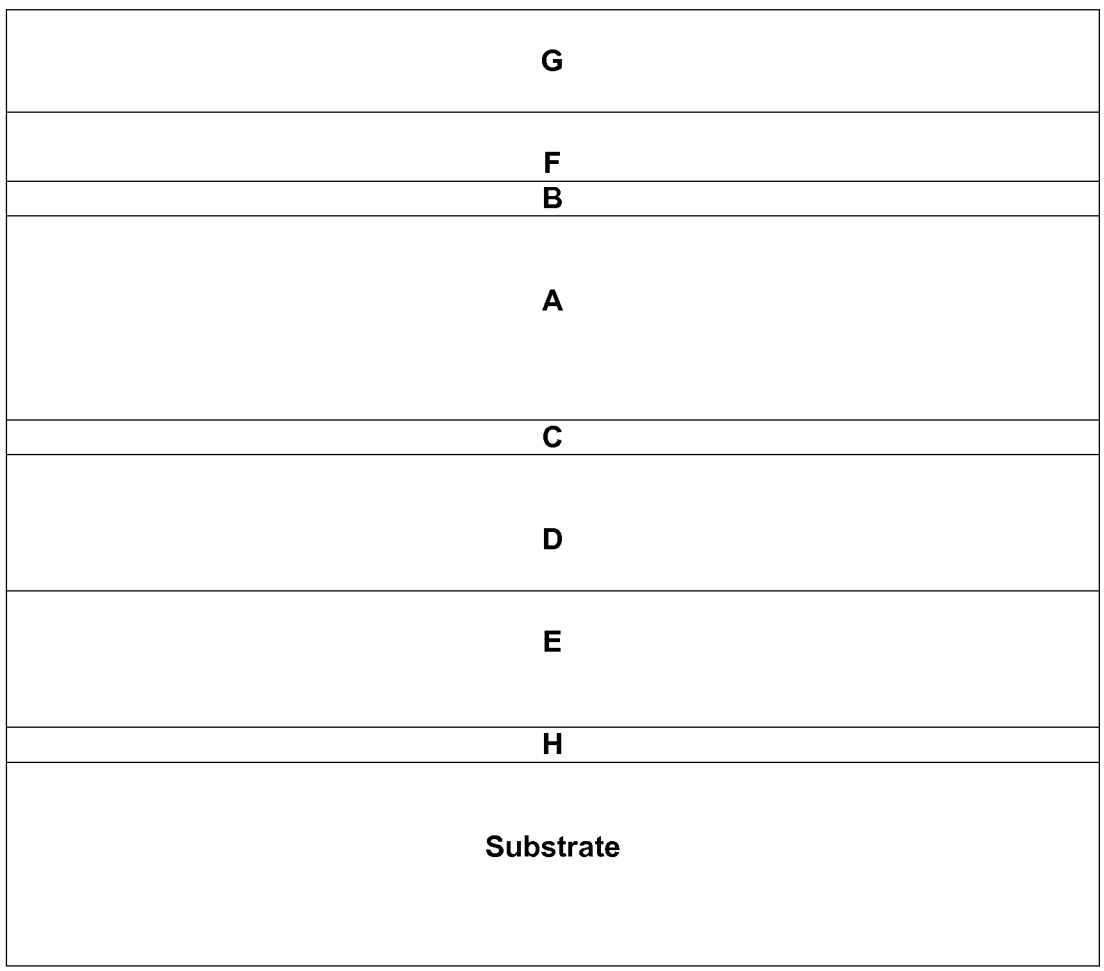

MULTILAYERED POLYOLEFIN FILMS

This application is a National Stage application of PCT/EP2018/057422, filed Mar. 23, 2018, which claims priority to European Patent Application No. 17382154.7 filed Mar. 28, 2017, the contents of each of which are hereby incorporated by reference in their entireties.

FIELD OF INVENTION

The present invention belongs to the field of polyolefin films useful for coating different substrates, such as wood substrates, in the furniture industry.

BACKGROUND OF THE INVENTION

Films are frequently used to seal foods and other packaged goods, but besides this, surface protection of articles of use also plays an important role. A protective film is applied to scratch-sensitive and fragile materials, such as, for example, glass or wood or printed or painted art work. U.S. Pat. No. 4,188,443 describes multilayer films useful for packaging.

Wood has a multitude of applications in the home as well as in industry. However, since wood is an organic substance, it is sensitive to environmental influences such as changes in the weather, humidity, water, solar radiation and biological pests. It is therefore often necessary to cover the wood with a protective facing which is resistant to these damaging factors.

In the furniture industry, a common practice is to use boards on which impregnated printed paper is laminated, allowing selection among a number of different finishes based on different resins, most frequently based on melamine resin, which are impregnated in order to protect the paper and give resistance to scratching, abrasion and chemical agents. This impregnated paper is glued to the wood boards by the application of heat and pressure, with the resin used for impregnation itself acting as an adhesive on the board.

Some companies in the furniture industry are interested in removing from their products hazardous compounds, such as formaldehyde, which are typically retained in melamine resins used in the processes mentioned before. In these cases, UV varnishes are applied to the printed paper to provide protection and resistance to scratch and abrasion. This structure is adhered to the boards using different adhesives, especially of the hot melt and polyurethane type, thereby providing structures free of hazardous compounds.

However, laminates of printed paper impregnated with melamine resin or with coated with UV varnishes on panels of wood fiber board and other furniture substrate panels are not capable of protecting the panels against the high ambient humidity as typically found in tropical or coastal areas because the paper is a porous substrate. Penetrating moisture leads to the deformation of the panels and formation of mold since both the panels and the paper tend to absorb moisture. This limits the usability in these regions, as it significantly reduces their life time. To solve these problems, the replacement of paper based substrates for plastic films in the furniture panel laminates has been proposed, since plastic films provide a much higher level of protection against absorption, and penetration of moisture as well as the formation of mold than paper.

Plastic substrates such as polyvinyl chloride (PVC) and polyethylene terephthalate (PET) films have been used for this purpose. These materials are laminated to the wood board by placing an adhesive between the plastic substrate and the board. WO2013017375A1 relates to laminated sheets comprising some polyolefin layers as well as a PVC outer decorative layer, for use in wall or floor covering in wet rooms. However, these substrates have some limitations or drawbacks. Besides their limited moisture barrier, PET films are difficult to be pigmented during the extrusion process, while PVC generates chlorine compounds regarded as toxic and environmentally harming during combustion of both production and post-consumer waste.

Polyolefin films provide excellent barrier versus moisture and have been effectively modified for the application of decorative and scratch resistant printings and coatings. Such polyolefin films can, for example, be made from polymers comprising ethylene, propylene, or any other alpha-olefins having from four to eight carbon atoms, all of which collectively addressed as alpha-olefins, or copolymers of such alpha-olefins, amongst which polymers of ethylene and propylene and their copolymers are preferred.

Polypropylene films, and more specifically bioriented polypropylene films, have a good resistance to moisture, in addition to excellent mechanical properties. Polyolefins and also other polymeric materials are known for having a surface which is difficult to print and coat with water-based inks and coating or lacquers. For this, the surface of polypropylene films require certain treatments and/or coatings which result in excellent printability and adhesion of printing inks, coatings and varnishes used for decoration and finishing of panels for the manufacture of furniture.

U.S. Pat. No. 4,828,928 relates to multilayer polyolefin films with good printability and optical properties. CN104029554A also relates to polyolefin films which can be printed for decorative purposes and which comprise a protective layer. US2016340916 relates to resilient floor coverings based on polyolefins, which can have multiple layer, including a backing layer, an ink layer and a wear layer. In respect of the adhesion to the substrate, CA2449161A1 relates to multilayer biaxially oriented polyolefin films which can adhere to glass bottles or paper, or be metallized and used for packaging.

US20040146730 relates to multilayer biaxially oriented films consisting at least of three layers. US20040146730 discloses five layer films where all layers are coextruded and biaxially oriented and which are used in applications which do not require high adhesion such as label film for in-mould labelling with polystyrene or as protective film for glass.

Particularly for coating wood substrates, US20160082700A1 relates to a self-adhesive material for a wood board formed by a polyolefin film with a layer providing adhesive bonding to the wood panel made of a resin comprising reactive MAH groups. These MAH groups are claimed to be an essential feature to form covalent bonds with hydroxyl groups of the wood.

Further, EP0782917A1 describes a three layer film which can be heat-laminated to the wood board without the separate application of an adhesive. This film manufactured by using blown film technology has an external coating of nylon, a middle layer of HDPE and a lower layer for adhesion of EVA or MA-g-EVA. This technology is well suited for the manufacture of flexible films which may be applied to plywood laminates before thermoforming them into complex three-dimensional objects like seats of chairs. Such blown films, however, are sensitive to deformation during manufacture, handling and application resulting in the formation of wrinkles and creases. Further, scratch protective layers if applied before the lamination step will crack on any deformation of the plastic film, intended or unintended, so that scratch protection will require the separate application of scratch protective lacquers to the final article.

Therefore, there is still a need of films that provide good moisture resistance, high opacity, UV protection and dimensional stability, which can also be printed by different techniques or incorporate a coating that provides scratch and abrasion resistance, and protection against stains and chemical agents to be applied to the substrate board in a simple heat-lamination step, and does not require any further finishing.

SUMMARY OF THE INVENTION

The present invention provides a polyolefin film with good moisture resistance, high opacity, UV protection and dimensional stability, which can be printed and which can incorporate a coating with high scratch resistance. The film of the invention has at least five layers but can comprise additional layers for improving certain aspects such as scratch resistance.

In a first aspect, the present invention relates to a polyolefin film comprising at least the following five layers:
a. a core layer (a) comprising a polyolefin;
b. an outer supporting layer (b) comprising polypropylene homopolymer, random or graft copolymers of ethylene/propylene, copolymers of ethylene with vinyl acetate (VA), acrylic amide (AAm), ethyl acrylate (EA), butyl acrylate (BA), vinyl alcohol (VOH), or maleic anhydride (MAH) and/or combinations thereof and/or propylene/ethylene random copolymers and/or polyethylene of medium density or combinations thereof;
c. an inner supporting layer (c) on the face of the core layer opposite to the outer supporting layer (b), comprising a polyolefin selected from copolymers or terpolymers of ethylene with higher alpha-olefins, a polyolefin plastomer, a linear low-density polyethylene (LLDPE), a metallocen LLDPE or random copolymers of ethylene with polar monomers selected from vinyl acetate (VA), acrylic amide (AAm), ethyl acrylate (EA), butyl acrylate (BA), vinyl alcohol (VOH), or maleic anhydride (MAH);
d. a first coating layer (d) immediately in contact with the inner supporting layer (c) comprising LDPE or copolymers of ethylene with one or several polar monomers, preferably the polar monomers are selected from VA, AAm, methyl acrylate (MA), EA, BA, VOH or MAH;
e. a second coating layer (e) in contact with the first coating layer (d) comprising copolymers of ethylene with one or several polar monomers, preferably the polar monomers are selected from VA, AAm, MA, EA, BA, VOH or MAH, wherein layers (a), (b) and (c) are co-extruded and are biaxially oriented and wherein the first coating layer (d) and the second coating layer (e) are co-extruded by co-extrusion-coating.

To make use of the excellent dimensional stability of biaxially oriented polypropylene substrate, comprising layers (a), (b) and (c) and being referred herein as BOPP substrate or BOPP film, the use of extrusion coating of adhesive layers onto the inner surface of a BOPP film has been explored. As it turned out polymers of sufficiently low melt flow index required for efficient and high quality extrusion coating are not suitable for thermo-lamination resulting in high bond strength to the wood panel substrate without the addition of a separate adhesive. On the other hand, resins that provide excellent bond strength are too high in melt index to be suitable for the extrusion coating process. Such resins are also known to tend to stick to the surface of polymer films of high surface tension as required for printing or the application of coatings and varnishes which leads to blocking against the outer surface of the BOPP base film when in contact with each other on a roll. Therefore, for the film of the present invention, the five layers cannot be coextruded in a single process. The adhesive layers (d) and (e) are very soft materials with a low melting point so that once they are given heat and pressure when laminating on the wood boards, they penetrate easily on the boards.

Surprisingly, it has been found now that the application of two layers of resins on the BOPP structure in a co-extrusion extrusion coating process, one of which providing processability in the extrusion coating process, the other enhancing significantly the adhesion to the wood panel substrate, sometimes also the structuring of the surface of the combined co-extruded layers, provide a film structure that is suitable for the thermo-lamination against wood panels without the use of further adhesives, in this way providing an excellent bond strength between wood panel and film. These adhesive layer (d) and (e) are not biaxially oriented, since the biaxial orientation of layer (a), (b) and (c) gives these layers their mechanical properties (such as that the film endures traction efforts so much in longitudinal sense like transversal without breaking and with a controlled elongation) that are neither needed nor desired for the adhesive layers, which need to be as soft as possible to penetrate the substrate and achieve a better adhesion.

DESCRIPTION OF THE INVENTION

The polyolefin film of the present invention incorporates an adhesive that permits a good adhesion of the film to the substrate by means of a thermo-lamination process.

Thus, this adhesive comprises several layers (at least layers (d) and (e), but can also comprise layer (h)), made using co-extrusion coating of layers (d) and (e) to join them together. Thus, a single film incorporates on its bioriented polypropylene body structure an adhesive for thermo-lamination, constituting a product with very good performances and ease of use for furniture manufacturers, since it only requires the application of pressure and heat on the film in a simple thermo-lamination process. Additionally, on the other side of the film a protective coating can be incorporated, which can be manufactured in a single multi-step process as the adhesive layers, making the manufacturing process fast, simple and efficient. Said protective coatings are illustrated as layers (f) and (g) in FIG. 1.

As used herein, the term "polyolefin" relates to polymers of olefins, i.e.: alkenes, such as ethylene, propylene, butane-1, methylpentene, etc., in common addressed as alpha-olefines or, as polymers, as polyolefines. Thus, polyolefins include polyethylene (PE), polypropylene (PP), polybutene-1 (PB-1), polymethylpentene (PMP), as well as polyolefin elastomers (POE) such as polyisobutylene (PIB), ethylene propylene copolymers (EP), and also PE copolymerized with other alpha-olefin such as 1-hexene, 1-octene, or longer.

As used herein, the term "higher alpha-olefins" relates to 1-hexene, 1-octene. As used herein, the term "polyolefin plastomer" relates to polymers with combined properties of plastics and elastomers.

In the polyolefin film of the first aspect, layers (a), (b) and (c) are co-extruded and are biaxially oriented and the first coating layer (d) and the second coating layer (e) are co-extruded simultaneously and applied by co-extrusion coating in a subsequent step.

In a preferred embodiment of the polyolefin film of the first aspect, the first coating layer (d) comprises EVA. Preferably, the EVA has between 5 and 25% by weight VA, more preferably between 10 and 20% by weight VA, in respect of the EVA weight. In a preferred embodiment, the EVA has a melt index (190° C./2.16 kg) between 5 and 20 g/10 minutes, preferably between 10 and 20 g/10 minutes. Also in a preferred embodiment, the first coating layer (d) further comprises LDPE or copolymers of ethylene with one or several polar monomers, preferably the polar monomers being selected from VA, AAm, MA, EA, BA, VOH or MAH and/or the first coating layer (d) has a grammage between 5 and 50 g/m$^2$, preferably between 8 and 35 g/m$^2$, more preferably between 10 and 25 g/m$^2$. This first coating layer (d) provides a sufficient stability of the melt curtain in the co-extrusion coating process to ensure an even thickness and width of the coating layer In a preferred embodiment of the polyolefin film of the first aspect, the second coating layer (e) comprises EVA. Preferably the EVA has between 15 and 40% by weight VA, more preferably between 20 and 35% by weight VA, in respect of the EVA weight. In a preferred embodiment, the EVA has a melt index (190° C./2.16 kg) between 20 and 400 g/10 minutes, preferably between 50 and 200 g/10 minutes. Also in a preferred embodiment, the second coating layer (e) further comprises copolymers of ethylene with one or several polar monomers, preferably the polar monomers being selected from VA, AAm, MA, EA, BA, VOH or MAH. In a preferred embodiment, the second coating layer (e) has a grammage between 5 and 50 g/m$^2$, preferably between 8 and 35 g/m$^2$, more preferably between 10 and 25 g/m$^2$ In a preferred embodiment, the roughness of the surface of the second coating layer (e) is characterized by a roughness $R_z$ of between 1 and 10 microns, preferably between 2 and 7 microns. Preferably, the roughness of the surface of the second coating layer (e) is controlled by contact with a cooling drum/chill roll of a structured surface to avoid blocking of the film during winding process.

In a preferred embodiment, the second coating layer (e) is oxidatively treated by means of a corona discharge, flame treatment or plasma treatment, preferably by corona discharge.

The second coating layer (e) provides a high degree of plasticity and a chemical composition especially suitable for high bond strength to the wood panel substrate to the inner coating layer in the thermolamination process. When the second coating layer (e) is oxidatively treated by means of a corona discharge, flame treatment or plasma treatment, preferably by corona discharge, a high level of adhesion to the wood or paper or cardboard substrate is achieved.

In a preferred embodiment of the polyolefin film with the co-extruded extrusion coated inner layers (d) and (e) features a certain level of inner surface roughness to avoid adhesion/blocking of the inner vs. the outer layers. Such roughness can be achieved by addition of roughening agents, meaning pigments of appropriate particle size or by impressing the required roughness into the surface by contact of the fresh co-extruded extrusion coated layer with a chill-roll serving as a matrix with a structured surface as a negative or by any other embossing technique. In a more preferred embodiment such roughness is impressed into the surface of the co-extruded extrusion coated inner layers (d) and (e) by contact of the fresh extrusion coated surface with the surface of a chill-roll which is structured with the appropriate level of roughness to serve as a matrix with a structured surface as a negative template for the rough inner surface.

In a preferred embodiment of the polyolefin film of the first aspect, the polyolefin of the core layer (a) is polypropylene (PP). In another preferred embodiment of the polyolefin film of the first aspect, the polyolefin of the core layer (a) is mainly polypropylene (PP) with from 2 to 20% by weight of an ethylene/propylene copolymer in respect of the total weight of layer a. Preferably, said core layer (a) has a thickness between 20 and 60 microns. In a preferred embodiment, said core layer (a) comprises an UV stabilizer, preferably at least one hindered amine light stabilizer (HALS). For example, the HALS is Chimassorb 2020, Chimassorb 944, Tinuvin 622, etc. In another preferred embodiment, the core layer (a) comprises a UV absorber of the benzophenone or benzotriazol type. The UV absorber may be for example Chimassorb 81. In a preferred embodiment, the content of HALS and UV absorbers in layer (a) is in the range from 0.1 to 5% by weight in respect of the total weight of this core layer (a).

For using this film in the wood industry the presence of UV stabilizers or UV absorbers is essential in order to guarantee the durability of the film at least during 8 to 10 years, as the polypropylene is sensible to the degradation of their polymeric chains when it is exposed to the sunlight.

The core layer (a) may be solid or voided. In a preferred embodiment, the core layer (a) is solid. In another preferred embodiment, the core layer (a) is voided. When the core layer (a) is voided the core layer (a) comprises voiding agents. Preferred voiding agents are selected from $CaCO_3$, of an average particle size (median value) of between 1 and 3.5 micron, polyamide (PA) and polybutylene terephthalate (PBT).

The core layer (a) can be transparent or opaque. In another preferred embodiment, the core layer (a) comprises pigments of at least one colour, preferably white or black, more preferably white, even more preferably the pigment is $TiO_2$. In a preferred embodiment, the pigment is of high opacity.

In another preferred embodiment, the core layer (a) comprises at least one stabilizer. Preferably, the stabilizer is an antioxidant, a process stabilizer or a lubricant. These stabilizer are additives commonly used in the polyolefin industry in order to facilitate the materials manufacture and handling, as well as in order to maintain their properties over time. Suitable stabilizers are for example Irganox 1010, Irganox 1078, Irgafos 168, Ultranox 626, calcium stearate and DHT-4A. In the same way, in another embodiment, the core layer (a) can comprise at least one antistatic agent and/or slip agent, preferably an ethoxylated amine. Suitable antistatic and/or slip agents are Armostat 300, Armostat 600, glycerol mono stearate, erucamide, behenamide, stearamide, mixed ester-amide of erucic acid and stearic acid, mixed di-amide of erucic acid and stearic acid.

In a preferred embodiment, layer (a) is between 40 and 50 microns thick and comprises between 50 and 90 weight %, more preferably between 60 and 80 weight % of PP with a melting point between 150 and 170° C. and a melt flow index between 1.0 and 4.0 g/10 min, between 9 and 40 weight %, more preferably between 15 and 30 weight % of a pigment such as $TiO_2$, up to 5 weight % of a HALS or UV absorber and up to 1 weight % of other stabilizers.

In a preferred embodiment of the polyolefin film of the first aspect, the outer supporting layer (b) comprises polypropylene homopolymers, graft or random copolymers of ethylene/propylene, or copolymers of ethylene with vinyl acetate (VA), acryl amide (AAm), ethyl acrylate (EA), butyl acrylate (BA), vinyl alcohol (VOH) or maleic anhydride (MAH) or combinations thereof and/or propylene ethylene random copolymers and/or polyethylenes and/or combinations of such resins. Among these copolymers, blends of propylene ethylene random copolymers and polyethylenes, MAH grafted PP and ethylene propylene copolymers grafted with MAH are particularly preferred. Suitable propylene ethylene random copolymers which are/may be blended with polyethylene are for example Eltex KS407 or Eltex KS409. Layer (b) comprises UV absorbers or HALS UV stabilizers and other stabilizers, such as the ones mentioned above for layer (a), as well as antistatic agents and/or slip agents mentioned above for layer (a).

In a preferred embodiment, said outer supporting layer (b) has a thickness between 0.3 and 5 microns, more preferably between 0.5 to 3 microns. In a preferred embodiment, the outer supporting layer (b) comprises an UV stabilizer, preferably at least one HALS and optionally one or several UV absorbers. As explained above, examples of HALS and blends of HALS with UV absorbers are Chimassorb 2020, Tinuvin 622, Chimassorb 81, and Chimassorb 944, among others. Preferably, the outer supporting layer (b) comprises a mineral filler, preferably selected from $CaCO_3$, $TiO_2$ and mixes thereof. Also preferably, the outer supporting layer (b) comprises an inorganic voiding agent, preferably selected from $CaCO_3$, talc, polybutylene terephthalate (PBT) or polyamide (PA). The voiding agent can also be any other mineral type of inorganic compound which is useful for voiding the layer and thus reducing its density, or providing roughness to the outer surface of that layer.

In a preferred embodiment, layer (b) is around 0.8 to 2.5 microns thick and comprises between 10 and 30 weight %, more preferably between 15 and 25 weight % of PP homopolymer, between 40 and 80 weight %, more preferably between 50 and 70 weight % of a random copolymer of ethylene and propylene having a melt flow index between 2 and 20 g/10 minutes and an ethylene content between 2 and 15% by weight, based on the copolymer, between 10 and 30 weight %, more preferably between 13 and 25 weight % of a voiding agent such as $CaCO_3$, between 1 and 8 weight % of $TiO_2$, up to 5 weight % of HALS and up to 1 weight % of other stabilizers. In another preferred embodiment, layer (b) is around 1.0 to 3.0 microns thick and comprises between 25 and 60 weight %, more preferably between 30 and 55 weight % of polyethylene of medium density, preferably between 0.915 and 0.945 g/cm$^3$, and a melt flow rate MFR (190/5) between 2 and 25, between 40 and 75 weight %, more preferably between 45 and 70 weight % of a random copolymer of ethylene and propylene having a melt flow rate MFR (230/2.16) between 2 and 20 g/10 minutes and a melting point according to DSC of 124 to 145° C., more preferred 125 and 137° C. and may comprise further between 1 and 12 weight % of $TiO_2$, up to 5 weight % of HALS and up to 1 weight % of other stabilizers. A suitable MDPE for this purpose is HF513 from Total, a suitable random copolymer of propylene and ethylene KS607 from INEOS. The weight % is always in respect of the total weight of the composition of the layer unless specified otherwise.

Preferably, the outer supporting layer (b) has matte appearance with a gloss between 10 and 50% at 45 degrees (45°), preferably between 20 and 40% at 45°.

In a preferred embodiment of the polyolefin film of the first aspect, the inner supporting layer (c) comprises a polyolefin plastomer, preferably an ethylene octene-1 plastomer with a melt index (190° C./2.16 kg) of 1 to 10 g/10 minutes. Preferably, the inner supporting layer (c) has a thickness between 1 and 5 microns. Preferably, the inner supporting layer (c) comprises antiblocking particles like silica or polymethylmetacrylate (PMMA) particles. The inner supporting layer (c) facilitates the adhesion between the base film formed by layers (a), (b) and (c) and the adhesive layer (d).

In another preferred embodiment, the inner supporting layer (c) comprises copolymers of ethylene with comonomers like VA, EA, BA, or other polymers like PE-g-MAH or PP-g-MAH.

The inner supporting layer (c) may also comprise at least one antistatic and/or slip agent. Said agents are for example Glycerol mono stearate, Erucamide, Behenamide, Stearamide, mixed ester-amide of erucic acid and stearic acid, mixed di-amide of erucic acid and stearic acid.

In a preferred embodiment, layer (c) comprises more than 80%, preferably more than 90 weight %, even more preferred more than 95 weight % of a plastomer based on ethylene octene-1, between 0.5 and 10, preferably between 0.5 and 10 weight %, more preferably between 1 and 4 weight % of a random copolymer of ethylene and propylene and up to 1 weight % of an antiblocking agent such as silica.

In a preferred embodiment of the polyolefin film of the first aspect, the film further comprises an outer coating layer (f) on top of the outer supporting layer (b), wherein the outer coating layer (f) comprises acrylates, unsaturated polyesters, urethanes, acrylic copolymer resins or combinations thereof and/or comprises pigments. Preferably, the outer coating layer (f) comprises an aliphatic urethane, acrylic copolymer resin blends or mixtures thereof. This layer (f), when present, is suitable to enhance the adhesion between layers (b) and (g).

In a preferred embodiment, said outer coating layer (f) has a dry grammage of 0.05 to 5.0 g/m$^2$, preferably of 0.1 to 4.0 g/m$^2$, more preferably of 0.3 to 3.0 g/m$^2$. Preferably, said outer coating layer (f) is applied by wet coating flexo or rotogravure. The surface of layer (f) shows an excellent long-term printability, defined as good ink adhesion (method) and appropriate spreading of the ink droplets (surface tension), by gravure, reverse gravure, flexo, spray, die/gap. This outer coating layer (f) has preferably a matte appearance with a gloss level under 50% measured at 45°.

In a preferred embodiment of the polyolefin film of the first aspect, the film further comprises an outer coating layer (g) on top of layer (b) or layer (f), if present, wherein said outer coating layer (g) comprises epoxy acrylates, polyester acrylates, polyether acrylate, urethane acrylates, acrylic acrylates, melamine acrylates, or blends thereof. In a preferred embodiment, said outer coating layer (g) has a dry grammage of 3 to 80 g/m$^2$, preferably of 4 to 50 g/m$^2$, more preferably of 5 to 20 g/m$^2$.

Preferably, said outer coating layer (g) is applied by gravure, flexo printing technology or die coating technology. In a preferred embodiment, said outer coating layer (g) is cured by UV or E-beam technology and preferably provides scratch resistance. Optionally, said outer coating layer (g) comprises a pigment.

In a preferred embodiment, the outer coating layer (g) provides a glossy appearance (gloss level higher than 70% at 45 degrees). In another preferred embodiment the outer coating layer (g) provides a matte appearance (gloss level below 40% at 45 degrees) by adding suitable matting agents to the coating, including but not limited to inorganic pigments like silica or fine-grained mineral powders, organic resins incompatible with the coating resin, cross-linked organic resin particles, transfer coating techniques using a matrix with a structured surface as a negative, or curing techniques based on space selective curing techniques. The outer coating layer (g) may also comprise other additives to improve properties such as scratch, abrasion and stain resistance, slip, anti-blocking, UV protection, leveling, and surface tension.

In a preferred embodiment of the polyolefin film of the first aspect, the film further comprises an outer coating layer (h) on top of the second coating layer (e) comprising acrylates, unsaturated polyesters, ionomers, urethane, acrylic copolymer resins or blends thereof, preferably an aliphatic urethane or acrylic copolymer resin blends. In a preferred embodiment, said coating layer (h) has a dry grammage of 0.01 to 1.0 g/m$^2$, preferably of 0.02 to 0.5 g/m$^2$, more preferably of 0.03 to 0.25 g/m$^2$. Said coating layer (h), when present, further enhances the adhesion of the film to the wood substrate.

In a preferred embodiment of the polyolefin film of the first aspect, layers (a), (b) and (c) are co-extruded and biaxially oriented in one step, and layers (d) and (e) are applied in a single step by co-extrusion coating in a subsequent step; layer (d) comprises EVA, with a VA content between 10 and 20% by weight in respect of the EVA weight and with a melt index (190° C./2.16 kg) between 10 and 20 g/10 minutes and has a grammage between 10 and 25 g/m$^2$; layer (e) comprises EVA, with a VA content between 20 and 35% by weight in respect of the EVA weight and with a melt index (190° C./2.16 kg) between 50 and 200 g/10 minutes and has a grammage between 10 and 25 g/m$^2$ and has a roughness imposed by impressing by a matrix such as a chill-roll with a structured surface as a negative characterized by an R$_z$ between 1 and 10 microns, preferably between 2 and 7 microns, more preferably between 3.5 and 7 microns; layer (a) comprises polypropylene and at least one UV stabilizer type HALS, optionally a UV absorber, and/or a white pigment TiO$_2$, and has a thickness between 20 and 60 microns; layer (b) comprises propylene ethylene random copolymer and a propylene homopolymer and comprises at least one HALS and at least one mineral filler, preferably selected from CaCO$_3$, TiO$_2$ and mixes thereof and at least one inorganic voiding agent, preferably selected from CaCO$_3$, talc, PBT or PA, and has a thickness between 1 and 5 microns; layer (c) comprises an ethylene octene-1 plastomer with a melt index (190° C./2.16 kg) of 1 to 10 g/10 minutes, an antiblock like silica and has a thickness between 1 and 5 microns.

In another preferred embodiment of the polyolefin film of the first aspect, layers (a), (b) and (c) are co-extruded and biaxially oriented, and layers (d) and (e) are applied in a single step by co-extrusion coating; layer (d) comprises EVA, with a VA content between 10 and 20% by weight in respect of the EVA weight and with a melt index (190° C./2.16 kg) between 10 and 20 g/10 minutes and has a grammage between 10 and 25 g/m$^2$; layer (e) comprises EVA, with a VA content between 20 and 35% by weight in respect of the EVA weight and with a melt index (190° C./2.16 kg) between 50 and 200 g/10 minutes and has a grammage between 10 and 25 g/m$^2$ and has a roughness imposed by impressing by a matrix such as a chill-roll with a structured surface as a negative characterized by an R$_z$ between 2 and 7, preferred between 3.5 and 7 microns; layer (a) comprises polypropylene and at least one UV stabilizer type HALS, optionally a UV absorber, and/or a white pigment TiO2, and has a thickness between 20 and 60 microns; layer (b) comprises propylene ethylene random copolymer and a polyethylene of medium density and comprises at least one HALS, and has a thickness between 1 and 5 microns; layer (c) comprises an ethylene octene-1 plastomer with a melt index (190° C./2.16 kg) of 1 to 10 g/10 minutes, an antiblock like silica and has a thickness between 1 and 5 microns.

A second aspect of the present invention relates to a wood board laminate which comprises the polyolefin film of the first aspect.

In a third aspect, the present invention relates to a process for the manufacture of the polyolefin film of the first aspect or the laminate of the second aspect, comprising the following steps:
 a. preparing the compositions of layers (a), (b) and (c);
 b. co-extruding layers (a), (b) and (c);
 c. stretching the three-layer film obtained in step (b) biaxially;
 d. optionally applying a corona, flame or plasma treatment on layer (b);
 e. applying layers (d) and (e) by co-extrusion coating in a single step;
 f. optionally applying a corona, flame or plasma treatment on layer (e);
 g. optionally applying layers (f), (g) and/or (h) by wet coating technology selected from flexo or rotogravure or die coating; and
 h. optionally laminating the film obtained in steps ((e), (f) or (h) on a substrate, preferably on a wood board.

The lamination of step (h) is preferably a thermolamination process, where the polyolefin film is simply adhered to the substrate by applying pressure and heat.

In a fourth aspect, the present invention related to the polyolefin film or to the laminate obtained by the process of the third aspect.

A fifth aspect of the present invention relates to the use of the polyolefin film of the first aspect for coating a substrate. Said substrate may be paper, cardboard or wood. In a preferred embodiment, the substrate is wood, preferably a wood board. In another embodiment, the substrate is free veneer plywood which may be applied to a wood board.

The parameters given herein have been measured using methods commonly used by the skilled person. For example, melt flow rate and melt index have been determined according to ISO 1133. Tensile properties have been determined according to ISO 527-1 and 527-2. Melting temperature has been determined according to ISO 11357-3:2011. Density has been determined according to ISO 1183. Gloss has been determined similar to ISO 2813, however, at a non-standard angle of 45 degrees. Roughness R$_z$ has been determined according to ISO 4287-1996 and documents cited therein using a cut-off of 0.25 mm.

Bonding strength has been tested as follows: a stripe of film of 25 mm width and sufficient length to connect with the moving clamp of a tensile tester when laminated onto a specimen of wood board and the wood board clamped to the lower clamp of that tensile tester in a way that the film is peeled off at an angle of 180 degrees. The test is run at a test head speed of 200 mm/min while the force is continuously recorded. Medium and maximum bonding strength forces and standard deviation and the mode of failure (film breaking across, film tearing as described below, woof fibers pulled off from the board) are reported as a function of lamination temperature.

Tear test is done as follows: A sheet of film is laminated onto a specimen of wood board about 20 cm by 20 cm in width and length. A cross cut of 3 cm each at an angle of about 90 degrees is made. The corner of the piece of film close to the cross point is carefully separated from the board on a length sufficient to hold the free end with the tip of the fingers, then peeled off at an angle of 180 degrees at a speed of about 2-3 cm per second and the mode of failure is recorded. The test is passed when the film starts disintegrating within 5 mm from the starting point of the peel by separating the outer part of the film from the inner part still glued to the board and fails completely within 20 mm from the starting point of the peel.

DESCRIPTION OF THE DRAWINGS

FIG. 1 illustrates the multilayer structure of the polyolefin film of the invention.

EXAMPLES

In order to provide a better understanding of the invention, the following is a detailed explanation of some of the preferred embodiments of the invention, which is provided to give an illustrative example of the invention but which, by no means, should be considered to limit the same.

Example 1

The manufacturing process begins with the production of a biaxially oriented polypropylene substrate, comprising layers (a), (b) and (c) and being referred herein as BOPP substrate, having a total thickness of 50 microns and a density between 0.9 to 1.0 g/cm$^3$.

The core layer (a) of the BOPP substrate comprises an extruded layer of 47 microns with the following composition:

| | |
|---|---|
| 77.3% by weight | of polypropylene homopolymer having a melting point of 165° C. and a melt flow index of 2.0 g/10 minutes. |
| 22.0% by weight | of titanium dioxide (rutile). |
| 0.6% by weight | of HALS. |
| About 0.1% by weight | of other stabilisers. |

This composition provides a white appearance, high opacity and protects the BOPP substrate from the UV degradation over time.

The outer supporting layer (b) of the BOPP substrate has a thickness of 2 microns with the following composition:

| | |
|---|---|
| 21.2% by weight | of polypropylene homopolymer. |
| 58.0% by weight | of random copolymer of ethylene and propylene having a melt flow index of 5.5 g/10 min and an ethylene content characterized by a melting temperature of 127° C. |
| 17.1% by weight | of calcium carbonate. |
| 3.0% by weight | of titanium dioxide. |
| 0.6% by weight | of HALS. |
| About 0.1% by weight | of other stabilisers. |

This composition provides a white appearance with certain voiding properties and a good surface for printability.

The inner supporting layer (c) of the BOPP substrate has a thickness of 1 micron with the following composition:

| | |
|---|---|
| 98.0% by weight | of plastomer based on ethylene octene-1. |
| 1.9% by weight | of random copolymer of ethylene and propylene. |
| 0.5% by weight | of UV stabilizer |
| 0.1% by weight | of silica as antiblocking agent with a particle size of 4 microns |

This inner supporting layer (c) provides a good compatibility between the BOPP substrate and the adhesive layer (d).

The production conditions of this BOPP substrate (comprising layers (a), (b) and (c)) were as follows:

| | | | |
|---|---|---|---|
| Extrusion | Temperatures | Layer a | 250° C. |
| | | Layer b | 235° C. |
| | | Layer c | 215° C. |
| Cooling roll | Temperature | | 45° C. |
| Longitudinal stretching | Temperature | | 100-120° C. |
| | Stretching ratio | | 1:5.0 |
| Transversal stretching | Temperature | | 160° C. |
| | Stretching ratio | | 1:9 |
| | Setting | | 170° C. |
| | Setting ratio | | 12% |
| Surface treatment | Corona discharge | Layer b | >38 dynes/cm |

After the manufacturing of the BOPP substrate, the film is conveyed to the co-extrusion coating process where the adhesive layer comprised by layers (d) and (e) is applied. These layers (d) and (e) are applied in a co-extrusion coating process.

Both layers (d) and (e) are comprised each one by an EVA with different characteristics and properties. These are the conditions and composition for each layer in this co-extrusion coating process:

| Co-extrusion coating | Temperature | Grammage | Vinyl acetate content | MFI (190° C./ 2.16 kg) |
|---|---|---|---|---|
| Layer (d) | 200-220° C. | 12 g/m$^2$ | 20% | 20 |
| Layer (e) | 170-190° C. | 12 g/m$^2$ | 28% | 150 |

The co-extrusion-coated layers were cast on the film and immediately pressed against a chill roll cooled to a temperature of 25° C.

After the co-extrusion, the adhesive layer (e) is corona treated to enhance the adhesion to the wood board (or to the subsequent adhesive layer (h), if was presented, as in Experimental example 2), resulting in a surface tension in adhesive layer (e) of at least 42 dynes/cm.

Once the complete film structure is produced the film is rewound and slit to the required width in a subsequent process. This film is ready for being laminated in a later process mainly on a wood substrate.

For the lamination process, the lamination temperature was 120° C. on the heated roll, and a medium bonding strength between the film and the wood substrate of 9N/25 mm was achieved. This bonding strength is achieved on top of wood boards produced from medium-density fibreboard (MDF) and particle board. For special wood panels such as MDI, the bonding strength was lower: 8.5 N/25 mm.

The tear test was passed successfully with this adhesive structure comprising layers (d) and (e).

Example 2

A five-layered white, opaque, UV stabilized and with an adhesive layer formed by a co-extrusion of two different types of EVA film, as described in Example 1. In addition, an extra adhesive layer (h) is applied on top of adhesive layer (e), in order to enhance the adhesion of the film to the wood substrate; especially in cases with a more difficult substrate in terms of adhesion between the film and the wood substrate is used, as methylene diphenyl diisocyanate (MDI) boards as example.

This adhesive layer (h) comprises an aliphatic urethane primer water-based applied by a wet coating process using rotogravure, and being after dried in an oven at a temperature between 70-80° C., in a dry thickness of 0.1-0.2 g/m².

For the lamination process, the lamination temperature was 120° C. on the heated roll and a medium bonding strength between the film and the wood substrate of 10 N/25 mm was achieved on top of a MDI wood board. In the same conditions, a bonding strength between the film and the wood substrate of 9.5 N/25 mm was achieved on top of a MDF board.

This improvement on the adhesion to the wood substrates is more clearly observed on the tear test, where specially in case of MDI boards the film starts disintegrating by separating the outer part of the film from the inner part still glued faster than in case of Example 1. This means that the film is able to tear more easily, which is an advantage due to in case of film is locally separated from the wood substrate, this tear property allows to limit the damage due to a prompt break, as happens when paper is used on wood substrates.

Comparative Example 3

A white, opaque, UV stabilized film as described in Example 1. But in this case, the adhesive layer is not formed by two layers (d) and (e) in a co-extrusion coating process. The only adhesive layer (d) is formed by an EVA with a vinyl acetate content of 20% and a melt flow index (190° C./2.16 kg) of 20 g/10 min, in a grammage of 24 g/m².

Adhesion strength is not as good as in Examples 1 and 2, where the adhesive layer comprises two (layers (d) and (e)) or three (layers (d), (e) and (h)) different layers.

For the lamination process, the lamination temperature was 120° C. on the heated roll and a bonding strength between the film and the wood substrate of 4 N/25 mm was achieved on top of a MDF board. In the same conditions, a bonding strength between the film and the wood substrate of 2.5 N/25 mm was achieved on top of a MDI board. This bonding adhesion is not enough for the wood board lamination purpose.

Also, the tear test did not show good results, because after performing this test, the film started peeling within more than 20 mm from the starting point.

Example 4

The film described at Example 1, additionally comprising an outer coating formed by layers (f) and (g) on top of the outer supporting layer (b).

Layer (f) consists of a coating that can be colored with different pigments or inks and can also act as a primer to improve the adhesion between layers (b) and (g). For this purpose, an aliphatic urethane water-based, combined with inks or pigments of several colors were used, applied by a wet coating process using rotogravure technology and after dried in an oven in a range of temperatures between 70-90° C., in a final dry grammage of 2 g/m².

A new coating (g) is applied on top of layer (f) in a grammage of 8 g/m² to provide a good scratch resistance to the final product. Urethane acrylates combined with matting agents are used, applied by flexo coating equipment and cured by E-Beam technology using a dose of 40 kGy. This surface has a good scratch and stain resistance.

The bonding strength values are the same than in Example 1, because the addition of this coating layers (f) and (g) does not affect the adhesion of the film to the wood board.

Finally, the following chart summarizes the adhesion properties show in each Example:

|  | Example 1 | Example 2 | Example 3 | Example 4 |
|---|---|---|---|---|
| Bonding strength on top of MDF board | 9N/25 mm | 9.5N/25 mm | 4N/25 mm | 9N/25 mm |
| Bonding strength on top of MDI board | 8.5N/25 mm | 10N/25 mm | 2.5N/25 mm | 8.5N/25 mm |
| Initial tear value on top of MDF board | 5 mm | 7 mm | 20 mm | 5 mm |
| Final tear value on top of MDF board | 18 mm | 17 mm | 30 mm | 18 mm |
| Initial tear value on top of MDI board | 6 mm | 5 mm | 25 mm | 6 mm |
| Final tear value on top of MDI board | 20 mm | 16 mm | 40 mm | 20 mm |

The invention claimed is:

1. A polyolefin film comprising at least the following five layers:
   a. a core layer (a) comprising a polypropylene (PP) and a UV stabilizer;
   b. an outer supporting layer (b) comprising polypropylene homopolymer, random or graft copolymers of ethylene/propylene, copolymers of ethylene with vinyl acetate (VA), acrylic amide (AAm), ethyl acrylate (EA), butyl acrylate (BA), vinyl alcohol (VOH), or maleic anhydride (MAH) and/or combinations thereof and/or propylene/ethylene random copolymers and/or polyethylene of medium density or combinations thereof;
   c. an inner supporting layer (c) on the face of the core layer opposite to the outer supporting layer (b), comprising a polyolefin selected from copolymers or terpolymers of ethylene with higher alpha-olefins, a polyolefin plastomer, a linear low-density polyethylene (LLDPE), a metallocen LLDPE or random copolymers of ethylene with polar monomers selected from vinyl acetate (VA), acryl amide (AAm), methyl acrylate (MA), ethyl acrylate (EA), butyl acrylate (BA), vinyl alcohol (VOH), or maleic anhydride (MAH);
   d. a first coating layer (d) immediately in contact with the inner supporting layer (c) comprising LLDPE or copolymers of ethylene with one or several polar monomers;
   e. a second coating layer (e) in contact with the first coating layer (d) comprising copolymers of ethylene with one or several polar monomers;
   wherein layers (a), (b) and (c) are co-extruded and are biaxially oriented and wherein the first coating layer (d) and the second coating layer (e) are co-extruded by co-extrusion-coating.

2. The polyolefin film according to claim 1, wherein the first coating layer (d) comprises EVA; and/or wherein the first coating layer (d) comprises EVA with a melt index (190° C./2.16 kg) between 5 and 20 g/10 minutes; and/or wherein the first coating layer (d) further comprises other polymers like LLDPE, or copolymers of ethylene with one or several monomers selected from MA, EA, AAm, BA, VOH, or MAH; and/or the first coating layer (d) has a grammage between 5 and 50 g/m².

3. The polyolefin film according to claim 1, wherein the second coating layer (e) comprises EVA; and/or wherein the EVA has a melt index (190° C./2.16 kg) between 20 and 400 g/10 minutes; and/or wherein the second coating layer (e) further comprises other ethylene copolymers with one or several monomers selected from MA, EA, AAm, BA, VOH or MAH; and/or wherein the second coating layer (e) has a grammage between 5 and 50 g/m²; and/or wherein the roughness of the surface of the second coating layer (e) is characterized by an $R_z$ of between 1 and 10 microns; and/or wherein the second coating layer (e) is oxidatively treated by means of a corona discharge, flame treatment or plasma treatment.

4. The polyolefin film according to claim 1, wherein the core layer (a) has a thickness between 20 and 60 microns; and/or the UV stabilizer comprises at least one hindered amine light stabilizer (HALS); and/or wherein the core layer (a) comprises an UV absorber; and/or wherein the content of HALS and UV absorbers is in the range from 0.1 to 5% by weight in respect of the total weight of layer (a); and/or wherein the core layer (a) is pigmented with inorganic pigments; and/or wherein the core layer (a) is solid or voided by means of voiding agents selected from $CaCO_3$, polyamide (PA) or polybutylene terephthalate (PBT).

5. The polyolefin film according to claim 1, wherein the outer supporting layer (b) comprises a polypropylene homopolymer, or graft or random copolymers of ethylene/propylene, or copolymers of ethylene with vinyl acetate (VA), acryl amide (AAm), ethyl acrylate (EA), butyl acrylate (BA), vinyl alcohol (VOH), or maleic anhydride (MAH) or combinations thereof and/or propylene ethylene random copolymers and/or polyethylene of medium density and/or combinations thereof; and/or has a thickness between 1 and 5 microns; and/or the outer supporting layer (b) comprises an UV stabilizer; and/or wherein the outer supporting layer (b) comprises an UV absorber; and/or the outer supporting layer (b) comprises a mineral filler; and/or the outer supporting layer (b) comprises an inorganic voiding agent.

6. The polyolefin film according to claim 1, wherein the inner supporting layer (c) comprises a polyolefin plastomer; and/or the inner supporting layer (c) has a thickness between 1 and 5 microns; and/or wherein the inner supporting layer (c) comprises antiblocking particles.

7. The polyolefin film according to claim 1, further comprising an outer coating layer (f) on top of the outer supporting layer (b), wherein the outer coating layer (f) comprises acrylates, unsaturated polyesters, urethanes, acrylic copolymer resins or combinations thereof and/or comprises pigments; and/or said outer coating layer (f) has a dry grammage of 0.05 to 5.0 g/m².

8. The polyolefin film according to claim 1, further comprising an outer coating layer (g) on top of layer (b) or layer (f), if present, wherein said outer coating layer (g) comprises epoxy acrylates, polyester acrylates, polyether acrylate, urethane acrylates, acrylic acrylates, melamine acrylates, or blends thereof; and/or wherein said outer coating layer (g) has a dry grammage of 3 to 80 g/m²; and/or wherein said outer coating layer (g) is applied by gravure, flexo printing technology or die coating technology; and/or wherein said outer coating layer (g) is cured by UV or E-beam technology.

9. The polyolefin film according to claim 1, further comprising an outer coating layer (h) on top of the second coating layer (e) comprising acrylates, unsaturated polyesters, ionomers, urethanes, acrylic copolymer resins or blends thereof; and/or wherein said coating layer (h) has a dry grammage of 0.01 to 1.0 g/m².

10. The polyolefin film according to claim 1, wherein layers (a), (b) and (c) are co-extruded and biaxially oriented, and wherein layers (d) and (e) are applied in a single step by co-extrusion coating; wherein layer (d) comprises EVA, with a VA content between 10 and 20% by weight in respect of the EVA weight and with a melt index (190° C./2.16 kg) between 10 and 20 g/10 minutes and has a grammage between 10 and 25 g/m²; wherein layer (e) comprises EVA, with a VA content between 20 and 35% by weight in respect of the EVA weight and with a melt index (190° C./2.16 kg) between 50 and 200 g/10 minutes and has a grammage between 10 and 25 g/m² and has a roughness characterized by a $R_z$ of between 2 and 7 microns; wherein layer (a) comprises polypropylene, a mineral filler comprising $TiO_2$ and at least one UV stabilizer, has a thickness between 20 and 60 microns; wherein layer (b) comprises propylene homopolymer or a propylene ethylene random copolymer, both optionally MAH grafted, and has a thickness between 1 and 5 microns, and comprises at least one HALS and at least one mineral filler selected from $CaCO_3$, $TiO_2$ or mixes thereof and at least one inorganic voiding agent selected from $CaCO_3$, talc, PBT or PA; wherein layer (c) comprises an ethylene octene-1 plastomer with a melt index (190° C./2.16 kg) of 1 to 10 g/10 minutes and has a thickness between 1 and 5 microns.

11. A wood board laminate which comprises the polyolefin film according to claim 1.

12. Process for the manufacture of the polyolefin film or the laminate of claim 1, comprising the following steps:
  a. preparing the compositions of layers (a), (b) and (c);
  b. co-extruding layers (a), (b) and (c);
  c. stretching the three-layer film obtained in step (b) biaxially;
  d. optionally applying a corona, flame or plasma treatment on layer (b);
  e. applying layers (d) and (e), by co-extrusion coating in a single step;
  f. optionally applying a corona, flame or plasma treatment on layer (e);
  g. optionally applying layers (f), (g) and/or (h) by wet coating technology selected from flexo or rotogravure or die coating; and
  h. optionally laminating the film obtained in steps ((e), (f) or (h) on a substrate.

13. A polyolefin film or laminate obtained by the process of claim 12.

14. The polyolefin film according to claim 1, wherein the polar monomers in the first coating layer (d) and the second coating layer (e) are selected from VA, AAm, MA, EA, BA, VOH or MAH.

15. The polyolefin film according to claim 2, wherein the first coating layer (d) comprises EVA with a VA content between 5 and 25% by weight in respect of the EVA weight; and/or wherein the first coating layer (d) comprises EVA with a melt index (190° C./2.16 kg) between 10 and 20 g/10 minutes; and/or the first coating layer (d) has a grammage between 8 and 35 g/m².

16. The polyolefin film according to claim 3, wherein the second coating layer (e) comprises EVA with a VA content between 15 and 40% by weight in respect of the EVA weight; and/or wherein the EVA has a melt index (190° C./2.16 kg) between 50 and 200 g/10 minutes; and/or wherein the second coating layer (e) has a grammage between 8 and 35 g/m²; and/or wherein the roughness of the surface of the second coating layer (e) is characterized by an $R_z$ of between 2 and 7 microns; and/or wherein the second coating layer (e) is oxidatively treated by means of a corona discharge, flame treatment or plasma treatment, by corona discharge.

17. The polyolefin film according to claim 5, wherein the UV stabilizer is at least one HALS; and/or wherein the mineral filler of the outer supporting layer (b) is selected from $CaCO_3$, $TiO_2$ or mixes thereof; and/or the inorganic voiding agent of the outer supporting layer (b) is selected from $CaCO_3$, talc, polybutylene terephthalate (PBT) or polyamide (PA).

18. The polyolefin film according to claim 6, wherein the polyolefin plastomer of the inner supporting layer (c) is an ethylene octene-1 plastomer with a melt index (190° C./2.16 kg) of 1 to 10 g/10 minutes; and/or the antiblocking particles in said inner supporting layer (c) are silica or PMMA particles.

19. The polyolefin film according to claim 7, wherein the outer coating layer (f) comprises an aliphatic urethane, acrylic copolymer resin blends or combinations thereof; and/or said outer coating layer (f) has a dry grammage of 0.1 to 4.0 $g/m^2$; and/or said outer coating layer (f) is applied by wet coating flexo or rotogravure.

20. The polyolefin film according to claim 9, wherein said an outer coating layer (h) comprises an aliphatic urethane or acrylic copolymer resin blends; and/or wherein said coating layer (h) has a dry grammage of 0.02 to 0.5 $g/m^2$; and/or wherein said outer coating layer (h) is applied by wet coating flexo or rotogravure.

21. A method of protecting a wood substrate from UV damage, which comprises applying the polyolefin film of claim 1 to the wood substrate.

\* \* \* \* \*